Oct. 15, 1946. A. B. ROGERS, SR 2,409,316
REMOVABLE AND COLLAPSIBLE SEATING FIXTURE
Filed Oct. 12, 1942 4 Sheets-Sheet 1

INVENTOR.
ALLAN B. ROGERS SR.
BY J. Edwin Coates
ATTORNEY

Oct. 15, 1946. A. B. ROGERS, SR 2,409,316
REMOVABLE AND COLLAPSIBLE SEATING FIXTURE
Filed Oct. 12, 1942 4 Sheets-Sheet 3
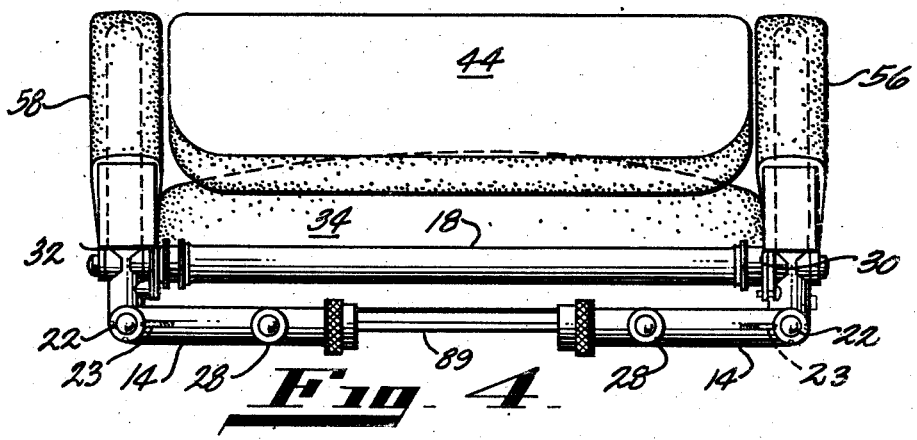
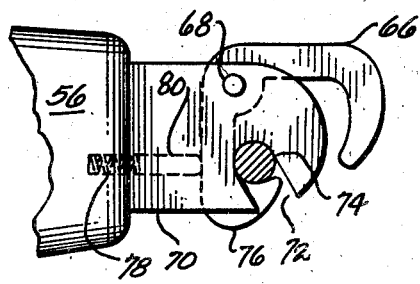
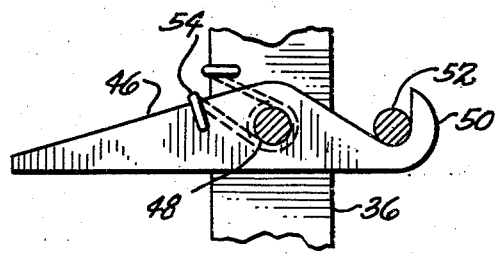
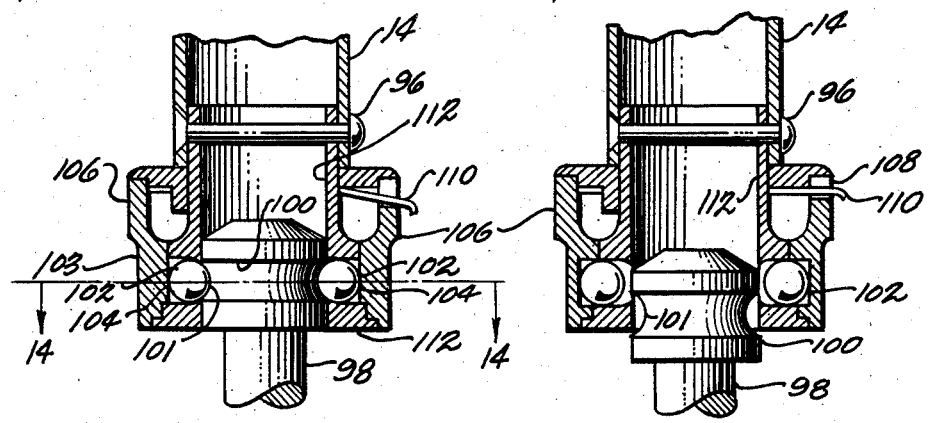
INVENTOR.
ALLAN B. ROGERS SR.
BY Edwin Coates
ATTORNEY Oct. 15, 1946.  A. B. ROGERS, SR  2,409,316
REMOVABLE AND COLLAPSIBLE SEATING FIXTURE
Filed Oct. 12, 1942  4 Sheets-Sheet 4
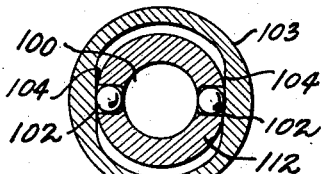
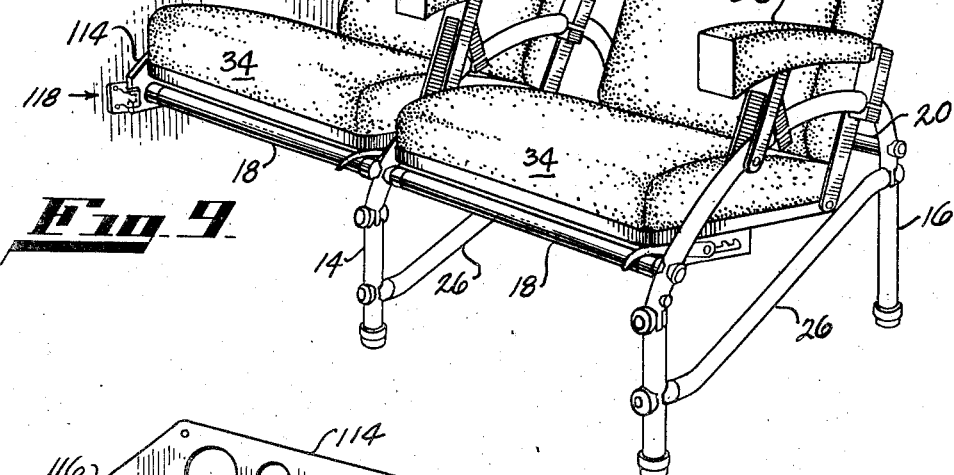
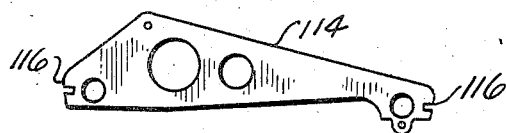
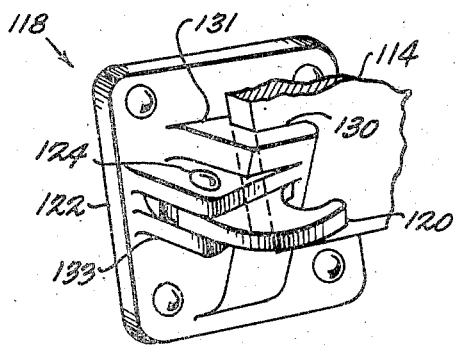
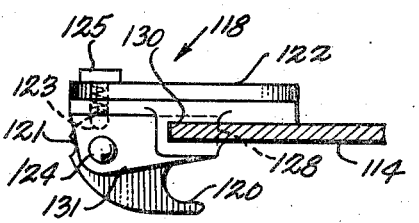
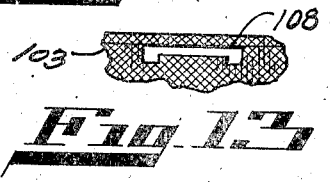
INVENTOR.
ALLAN B. ROGERS SR.
BY Edwin Coates
ATTORNEY Patented Oct. 15, 1946

2,409,316

UNITED STATES PATENT OFFICE 2,409,316

REMOVABLE AND COLLAPSIBLE SEATING FIXTURE

Allan B. Rogers, Sr., Santa Monica, Calif., assignor to Douglas Aircraft Company, Inc., Santa Monica, Calif.

Application October 12, 1942, Serial No. 461,807

8 Claims. (Cl. 155—116)

This invention relates to an adjustable folding chair which in its preferred embodiment is particularly adapted for use in airplanes wherein it is desired to vary the sizes of the passenger or cargo compartments to suit the particular demands for accommodations on each trip.

It has been the practice to designate certain airplane models as cargo carrying airplanes and certain other models as passenger carrying airplanes. In most passenger carrying airplanes it has been customary to set aside a certain amount of space near the center of gravity of the airplane for carrying cargo and air express. This cargo carrying space at times is too small to care for the volume of cargo available. At other times the passenger carrying space is too small. For example in some districts early morning and early evening trips use all available space for passengers while other trips during the day require a lesser number of chairs and more cargo space. It is not profitable to haul a fully loaded airplane in one direction and return it empty. Furthermore the number of airplanes available on most airlines is limited and it is not feasible to have one airplane for cargo and another for passengers. Therefore, that the airlines may hold at a low figure the mileage cost, an airplane should haul more cargo during the hours of light passenger traffic than the hours of heavy passenger traffic to utilize the full revenue capacity of the airplane.

It is therefore desirable that the space adapted for carrying cargo and that for carrying passengers be variable by means of a movable partition therebetween, as disclosed in Patent No. 2,396,039 so that either space may be readily increased or decreased. In order to enlarge the cargo compartment in this type of airplane interior it is necessary to remove a predetermined number of passenger chairs from their wall and floor mountings when the wall separating the cargo and passenger compartments is moved to increase the cargo compartment. It is further desirable that the chairs be of light construction so that they may be moved with ease to stowing position as disclosed in Patent No. 2,396,039.

The chair of this invention has a light tubing frame comprising spaced side members the legs of which are adapted to be quickly removed from the wall and the floor and folded compactly under the frame. A seat and back which are provided between the upright members are interconnected and interlocked in such a way that the back may be adjusted to occupy several positions varying from upright to semi-reclining by longitudinally shifting the seat. Arms provided on the side members may be moved to a folding position so that with both legs and arms folded the chair becomes a compact article for stowing in another portion of the airplane.

The chairs may be used either singly or in multiple as the space available may determine, two chair units having a common side frame between them. They may be attached to a wall at one end in lieu of being supported by legs at that end. When a chair is thus supported a wall attachment plate is secured to the ends of the cross members of the chair adjacent the wall in lieu of legs.

The principal object of this invention is to provide a chair for airplanes or the like which is light in construction, simple in operation and requires a minimum of time for removal from the floor for stowing.

Another object of this invention is to provide a tubular frame having upright side members the lower portions of which are foldable thereunder.

Another object of this invention is to provide quick-release floor attachments on each of the foldable legs.

Another object of this invention is to provide means for changing the seat and seat back from an upright to a semi-reclining position.

Another object of this invention is to provide means for folding the seat so that it can be made into a neat compact package for stowing.

Another object of this invention is to provide means for attaching a second chair to the first to provide a substantial unit of attractive appearance.

Another object of this invention is to provide means for attaching and locking the seats to the wall at the same time they are attached to the floor.

Still another object of this invention is to provide on the upper portion of the side members means for folding the arms snugly thereon.

Further objects and advantages of this invention will be brought out in the following description taken in connection with the accompanying drawings and appended claims.

Referring now to the drawings:

Figure 4 is a front elevation of the chair showing it completely folded.

Figure 5 is an enlarged fragmentary view of the automatic arm attachment catch.

Figure 6 is an enlarged side elevation of the chair back locking device.

Figure 7 is an enlarged section through the quick-release floor attachment showing the attachment set in the locked position.

Figure 8 is an enlarged section through the quick-release floor attachment similar to Figure 7 showing the attachment set in the unlocked position.

Figure 9 is a perspective view showing the method of attaching two chairs to make a single unit.

Figure 10 is a side elevation of the wall attachment bracket which attaches to the second seat frame.

Figure 11 is a perspective view of the wall bracket locking device showing a fragmentary portion of the wall bracket in place.

Figure 12 is a top elevation of the wall bracket inserted in the locking device.

Figure 13 is a fragmentary elevational view of the sleeve 103, showing the slot 108.

Figure 14 is a reduced sectional view taken as indicated by the line 14—14 of Figure 7.

Figure 1:
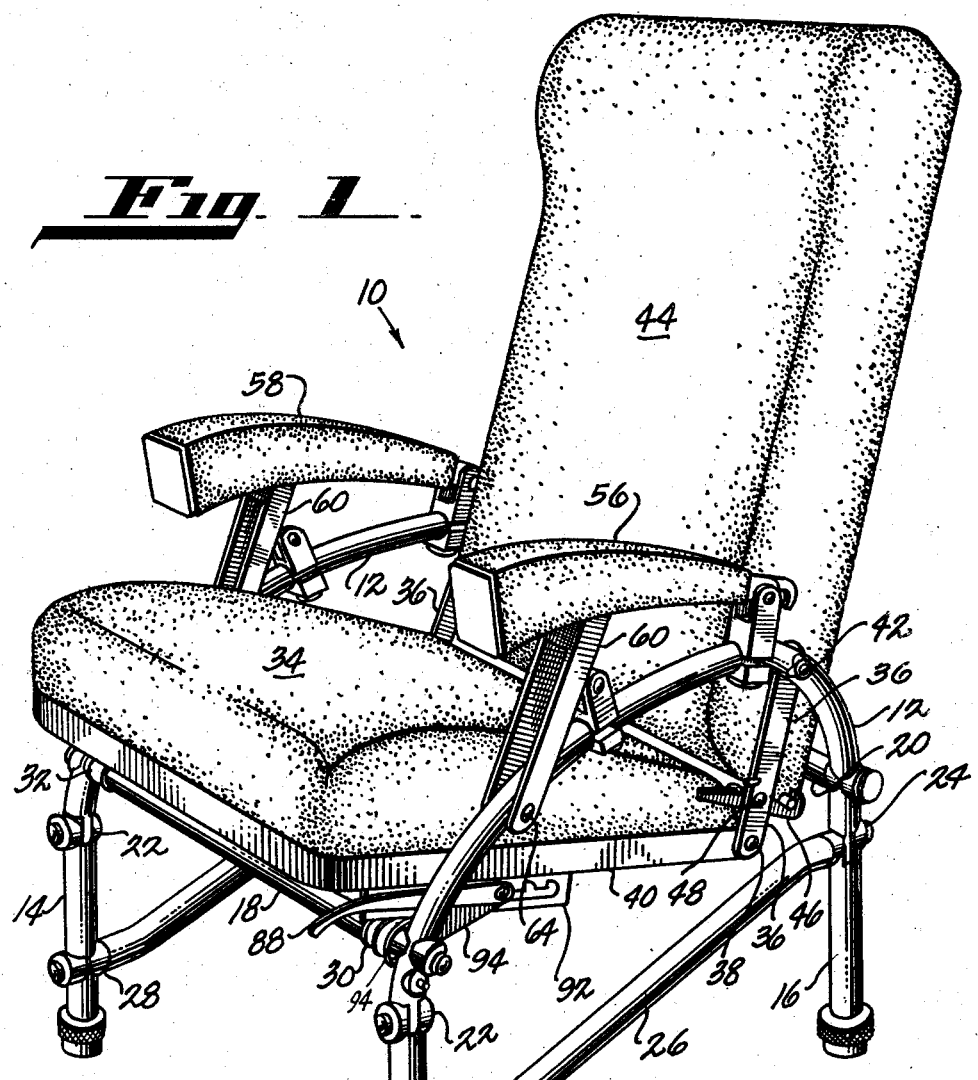
Figure 1 is a perspective view showing the preferred embodiment of the folding chair.
Figure 15:
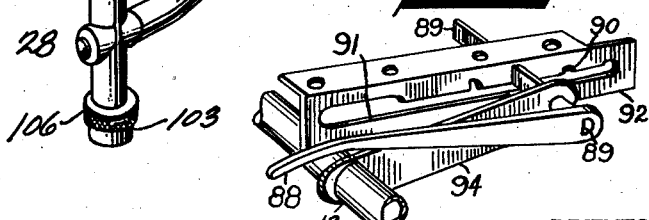
Figure 15 is a fragmentary view in perspective of the means for locking the seat in a desired adjusted position.

In detail and with reference to the accompanying drawings in the preferred embodiment of this invention, Figures 1, 2, 3 and 4 show a chair 10 having two horizontally spaced rigid upper side frame members 12 which are supported by foldable front and rear legs 14 and 16. The legs 14 and 16 are pivoted to the members at 22 and 24, and are each securable in either horizontal or vertical position by the spring urged detent pin 23, from which positions they may be released by pressure applied to the leg tangentially of the hinge axis. These legs are braced by a tubular bar 26 which is fastened to the front leg 14 at 28 and extends upwardly and rearwardly to the pivot point 24. The frame also comprises a front cross member 18 and a rear cross member 20 adapted to hold the side members 12 in rigid spaced relation. The front cross member 18 is provided with a pair of rollers 30 and 32 rotatable thereon.

A seat 34 is suspended at its rear corners by a pair of links 36 which are pivoted at 38 to the seat frame 40 and pivoted at their upper ends to the frame member 12 at 42. The forward portion of the seat rides on the rollers 30 and 32 on the front cross member 18. A chair back 44 is pivoted to and between the members 12 at 42 on the same axis with the links 36. As shown in Figure 6 a locking lever 46 is pivoted at 48 to each of the links 36. This locking lever is provided with a hook 50 on one extremity thereof which is yieldably held in engagement with a pin 52 by a spring 54 (see Fig. 6). The pin 52 is set in the lower portion of the back frame and prevents accidental separation of the back from the seat. The hook and pin connection nevertheless permits the back to be angularly moved about the axis 42 as the seat is moved relative to the frame.

The forward portions of a pair of arm rests 56 and 58 are pivoted to the members 12 by means of links 60. Each link is pivotally connected to an arm at 62 and to a member 12 at 64. As shown in Figure 5 the rear portion of each arm is provided with an automatic locking mechanism comprising a locking member 66 which pivots at 68 to an extension 70 on each arm. The extension 70 is provided with a slot 72 which receives a rod 74. A hook 76 on the locking member 66 is resiliently held in the locked position by a spring 78 and the plunger 80 so as to force the hook 76 into engagement with the rod 74 to hold it securely in the slot 72. The rod 74 is held in rigid relation to the member 12 by a rear attachment lug 82 which is securely clamped to the member 12 at 83. An auxiliary attachment lug 84 is placed on the member 12 at 86 so that the locking member on the arm may be removed from the first attachment lug 82 to be placed on the second attachment lug 84 when the chair is folded.

Movement of the seat forward or backward is controlled by a handle 88 which rotates a flattened rod 89 for engagement with a plurality of notches 90 in a pair of slotted members 92 secured to the bottom of the seat at each side thereof in accordance with the usual construction of devices of this character. A link 94 is pivoted to the front cross member 18 and holds the rod 89 to an arcuate path about the cross member 18 of the frame so that the seat may be held solidly in any position of adjustment.

Quick release floor attachments, shown in Figure 7 in the locked position, and in Figure 8 in the unlocked position, are secured to each of the legs of the chair. A tubular fitting 112 is riveted to the chair leg at 96. A bolt 98 is secured to the airplane floor and provided with a head 100 having an annular groove 101. This bolt is held in the locking assembly by a pair of steel balls 102 seated in radial apertures in the fitting 112 which are moved by a radially eccentric cam 104 on the inner face of a sleeve 103 into groove 101 as the sleeve 103 is rotated. (See Figure 14.) When cam 104 is rotated out of engagement with balls 103 they are free to move out of groove 101.

The upper portion of the sleeve is provided with a knurled surface 106 for manually rotating the sleeve and with a slot 108 extending over a limited arc around the sleeve. A resilient radial catch member 110 is secured to the fitting 112. Each end of the slot 108 in the sleeve 103 is provided with a downwardly offset notch (see Figure 13), these notches being adapted to engage and automatically hold the resilient catch member in a locked or unlocked position, depending upon the direction the outer sleeve is turned.

Two or more of the chair units may be joined in lateral alignment by using a common side frame member 12 between each two units, the front and rear cross members of adjoining units being designed to be coupled to form through cross members.

A single or multiple unit chair may be supported at one end on an adjacent wall. For this purpose the ends of the front and rear cross members are constructed so that they may have secured thereto a wall attachment plate 114 shown in Figure 10 instead of a side frame member 12, at the chair end adjacent the wall. A notch 116 is provided in each end of the wall attachment plate and is located to cooperate with lock assemblies 118 attached to the wall, the front assembly being as shown in Figures 11 and 12. A latch 120 is pivotally mounted on ears 131 and 133 of a bracket 122 of the lock assembly 118 at 124. The latch 120 is held in either an open or closed position by the engagement of a spring loaded ball assembly 125 set in the bracket 122 which is adapted to engage either one of two notches 121 and 123 around a curved portion of the latch 120. Thus when the wall plate 114 is set in a notch 130 formed in the ears 131 and 133 of the locking assembly 118, a tongue 128 on the latch is adapted to move on its pivot into the notch 116 provided in the wall attachment plate 114. In this manner the wall plate is locked against movement in any direction.

In operation the complete chair in the customary form for vehicle passenger use comprises two seats fastened together as described hereinabove which are secured both to the floor and to the wall. By means of the handle 88 the passenger may adjust the seat in any position he desires from an upright to a semi-reclining position. As the passenger moves the handle upward the flattened rod 89 to which the handle is secured is rotated and disengaged from the notches in the slotted member 92 so that a slight movement of his body forward or backward will urge the seat and back to the position desired. As soon as the handle is released one of the several notches in the slotted member 92 is engaged by the flattened rod 89 as the same returns to its normal position so that the seat and back will remain in the newly adjusted position.

Figures 2, 3:
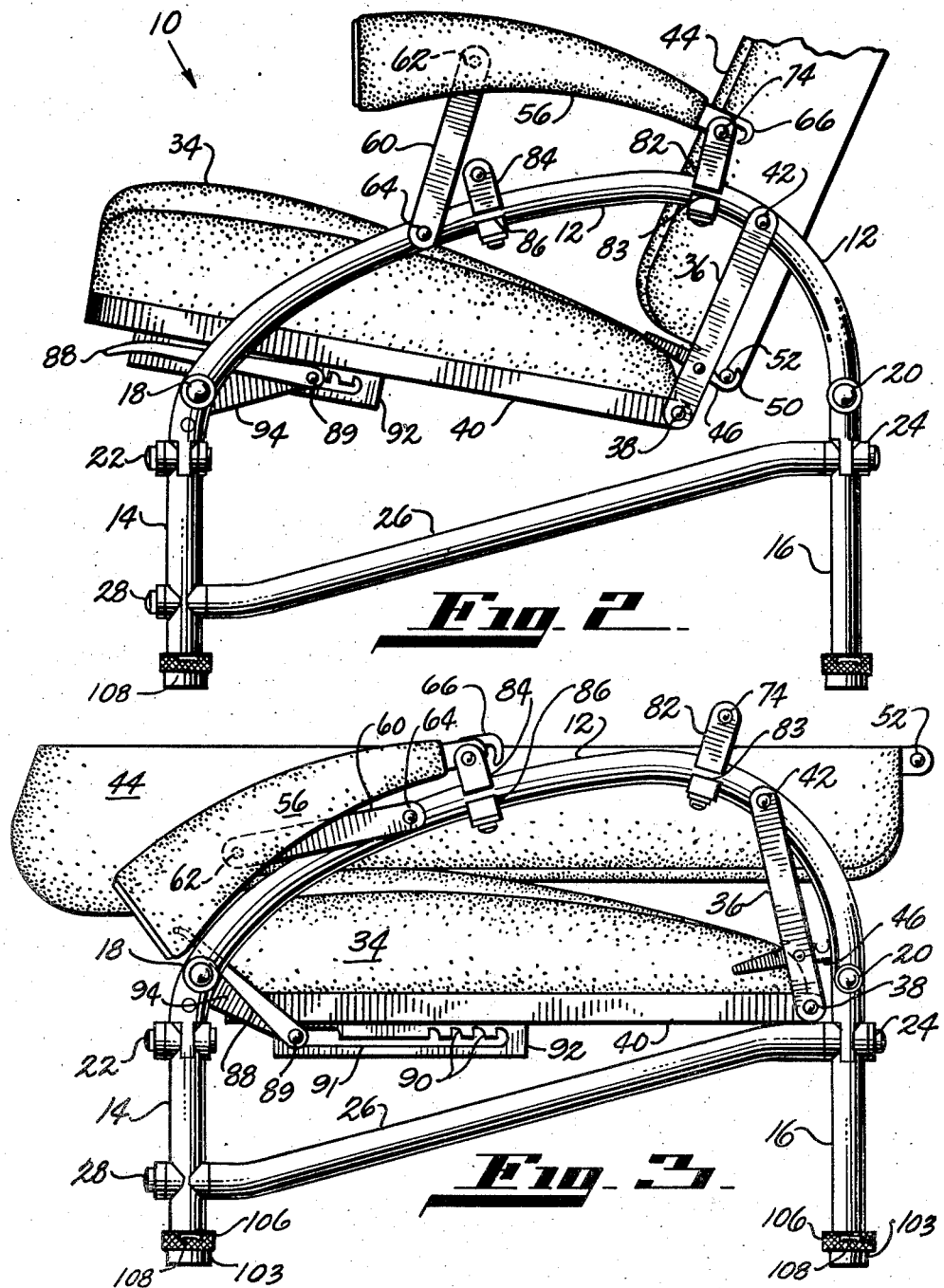
Figure 2 is a partial side elevation of the folding chair.
Figure 3 is a side elevation of the chair with seat and back in folded position.

To remove the seats from the floor and wall in the passenger compartment for stowing in another part of the airplane the handle 88 is released and the seat pushed backward until the flattened rod 89 rests in the passage 91 in front of the notches 90 in the slotted member 92. This backward movement of the seat 34 causes the upper portion of the chair back 44 to move forward by reason of the back being pivotally connected to the link 36. To complete the folding movement of the chair back, the handle of the locking lever 46 is pulled upwardly against the action of the spring 54 so that the hook 50 is disengaged from the pin 52 set in the lower portion of the seat back. This action releases the back so that it folds forwardly about the pivot 42 to rest in a horizontal position above the seat which has moved backwardly and downwardly as shown in Figure 3. In moving the seat backwardly it is pushed off the rollers on the front cross member 18 and suspended in a lower position by the links 36 and 94.

So that no part of the chair projects above the back after the same has been folded over the seat, the arms 56 of the chair must be folded forwardly and downwardly. This is accomplished by pushing the locking member 66 on both arms downwardly against the action of the plunger 80 and spring 78. This allows the rearward portion of the arms to be lifted upward so that they are disengaged from the rod 74 in the rear attachment lug 82. The arms may now be pushed forward by reason of the links 60 until the slot 72 in the extension 70 at the rear of the arm is in line with auxiliary attachment lug 84. The arm is then pushed downwardly until the catch 76 snaps into place. The seat is now ready for removal from the floor.

The resilient catch members 110 on the floor attachments are moved upwardly until the knurled portion 106 of the outer sleeve may be turned. After the outer sleeve has been turned so that the resilient catch snaps into the recess in the opposite end of the slot 108 balls 102 are free to be released from the annular groove 101 in the floor bolt 98 by the removal of the pressure of cam 104 in the outer sleeve so that the legs are ready for removal from the floor bolt. After all floor attachments are unlocked the seats are re- moved from the wall. The latch members 120 must be pulled outwardly. This action removes the tongue members 128 from the notches 116 in the wall plate. The entire seat assembly is now lifted upwardly from the floor, the legs 14 and 16 are folded under the seat and the unit is ready for stowing. This procedure must be reversed in order to reinstall the chairs to their proper positions in the passenger compartment.

I claim:

1. An adjustable folding chair comprising a frame having a front cross member; rollers on said cross member; a seat slidably mounted on said rollers; a link; means for pivotally connecting the opposite ends of said link to the rear portion of said seat and said frame respectively whereby said seat may be slidably moved relative to said cross member; a back rest; means for pivotally connecting said back rest intermediate the ends thereof to said frame; and means for pivotally interconnecting said link and the lower portion of said back rest whereby said back rest will be angularly adjusted about the pivotal connection between the same and said frame as the seat is adjusted.

2. In an adjustable folding chair: a frame comprising a front cross member; rollers on said cross member; a seat slidable on said rollers so that said seat can be moved in a fore and aft direction with respect to said cross member; a link; means for pivotally connecting the opposite ends of said link to the rear portion of said seat and said frame respectively; a back rest pivoted on said frame for movement to and from a position overlying said seat in substantial parallelism therewith; and means having connecting means thereon for pivotally interconnecting said seat and back rest, said connecting means being manually releasable to permit said back rest to be pivotally moved to a position overlying said seat.

3. In an adjustable folding chair: a main frame, said main frame having a pair of vertically disposed side members and front and rear cross members holding said vertically disposed members in horizontally spaced relation: a seat; means for slidably supporting said seat on said front cross member; a pair of links; means for pivotally connecting the opposite ends of each link to a vertical side member and a side edge of said seat respectively, so that said seat may be slidably moved relative to said front member; a back rest; means for pivoting said back rest between said vertical side members; means for pivotally connecting said back rest to said links to give said back rest a definite relative position with respect to said seat for each position of adjustment of said seat, said last named connecting means being operable to release said back rest so that it may be pivotally moved to a position overlying said seat; a pair of arm rests; and means for mounting said arm rests on said side members, said means permitting said arm rests to be moved from an operative position extending above said side members to a non-operative position in substantial contact with said side members when the back rest is pivotally moved to a position overlying said seat.

4. In an adjustable folding chair: a main frame having a pair of vertically disposed side members and horizontally disposed front and rear members in spaced relation; a seat; a pair of links; means for pivotally connecting the opposite ends of each link to a vertical side member and a side edge of said seat adjacent the rear portion thereof respectively; means on said frame for slidably supporting the front portion of said seat whereby the same may be moved between forward and rearward portions relative to said frame; a back rest; means for pivotally connecting said back rest between said vertical side members; and means for pivotally connecting the lower portion of said back rest to said links adjacent the rear edge of said seat so that movement of said seat brings about conjoint movement of said back rest.

5. In a seat of the type described: a main frame having front and rear cross members spacing apart a pair of vertical side members; a seat; a pair of links; means for pivotally connecting the opposite ends of each link to a vertical side member and a side edge of said seat adjacent the rear thereof respectively; means for slidably supporting the front portion of said seat on said front cross member; a back rest; means for pivotally mounting said back rest to said vertical side members for movement to and from a position overlying said seat in substantial parallelism therewith; means for pivotally connecting said back rest to said seat whereby said back rest is pivotally moved relative to said frame as said seat is moved; and means for manually releasing said connecting means whereby said back rest may be folded against said seat.

6. An adjustable folding chair comprising a frame having a front cross member; rollers on said cross member; a seat slidably mounted on said rollers; a link; means for pivotally connecting the opposite ends of said link to the rear portion of said seat and said frame respectively whereby said seat may be slidably moved relative to said cross member; a back rest; means for pivotally connecting said back rest intermediate the ends thereof to said frame; a hook pivotally carried by said link; a pin carried by the back rest adjacent the lower edge thereof and adapted to be engaged by said hook for pivotally interconnecting said link and the lower portion of said back rest whereby said back rest will be angularly adjusted about the pivotal connection between the same and said frame as the seat is adjusted; and means for locking said seat in a selected position of adjustment.

7. In an adjustable folding chair: a main frame, said main frame having a pair of vertically disposed side members and front and rear cross members holding said vertically disposed members in horizontal spaced relation: a seat; a pair of elongate links; means for pivotally connecting an end of a link to each vertical side member; means for pivotally connecting the free ends of said links to opposite sides of said seat adjacent the rear edge thereof; means for slidably supporting the front portion of said seat on said front cross member; a back rest; means for pivotally mounting said back rest between said side members for movement about the axis of the pivotal connection between said elongate links and the vertical side members; and means for pivotally interconnecting the lower edge of said back rest and the elongate links whereby said back rest will be pivotally moved as said seat is slidably moved over the supporting means on said front cross member.

8. An adjustable folding chair comprising a frame having a front cross member; rollers on said cross member; a seat slidably mounted on said rollers; a link; means for pivotally connecting the opposite ends of said link to the rear portion of said seat and said frame respectively whereby said seat may be slidably moved relative to said cross member; a back rest; means for pivotally connecting said back rest intermediate the ends thereof to said frame; a hook pivotally carried by said link; a pin carried by the back rest adjacent the lower edge thereof and adapted to be engaged by said hook for pivotally interconnecting said link and the lower portion of said back rest whereby said back rest will be angularly adjusted about the pivotal connection between the same and said frame as the seat is adjusted; and resilient means for normally holding said hook in engagement with said pin, said resilient means permitting said hook to be moved out of engagement with said pin whereby said back rest may be moved to a position overlying said seat.

ALLAN B. ROGERS, Sr.